United States Patent [19]

Harrison

[11] Patent Number: 5,735,168
[45] Date of Patent: Apr. 7, 1998

[54] ANIMAL FEEDER SIGHT GLASS DEVICE

[76] Inventor: Jack Harrison, 10625 County Rd. 200, Alvin, Tex. 77511

[21] Appl. No.: 636,480

[22] Filed: Apr. 23, 1996

[51] Int. Cl.[6] .................................................. G01F 23/02
[52] U.S. Cl. ........................... 73/323; 73/325; 116/276
[58] Field of Search ............................. 73/323, 325, 326, 73/328, 329, 330; 116/276, 227

[56] References Cited

U.S. PATENT DOCUMENTS

| | | |
|---|---|---|
| 1,039,060 | 9/1912 | Hughes . |
| 2,620,662 | 12/1952 | Henderson ................................. 73/323 |
| 2,647,406 | 8/1953 | Sorensen ..................................... 73/334 |
| 3,125,882 | 3/1964 | Johnson et al. .......................... 116/276 |
| 3,407,662 | 10/1968 | Tarbox . |
| 3,438,540 | 4/1969 | LeRoy . |
| 3,625,390 | 12/1971 | McGinnis . |
| 3,737,169 | 6/1973 | Glynn ................................. 277/DIG. 6 |
| 3,832,901 | 9/1974 | Girvin, III .................................. 73/325 |
| 3,942,881 | 3/1976 | McGinnis . |
| 3,951,301 | 4/1976 | McGinnis . |
| 3,957,359 | 5/1976 | McGinnis . |
| 3,991,913 | 11/1976 | Steffen . |
| 4,162,826 | 7/1979 | Van Der Beck et al. ................. 73/325 |
| 4,169,309 | 10/1979 | McGinnis . |
| 4,182,179 | 1/1980 | McGinnis . |
| 4,206,537 | 6/1980 | McGinnis . |
| 4,372,652 | 2/1983 | Pontefract ................................. 73/328 |
| 4,376,490 | 3/1983 | Mizusaki ................................... 73/323 |
| 4,436,375 | 3/1984 | McGinnis . |
| 4,809,862 | 3/1989 | Canty . |
| 4,986,636 | 1/1991 | Contzen et al. . |
| 5,210,658 | 5/1993 | Foster . |
| 5,297,429 | 3/1994 | Brown et al. .............................. 73/323 |
| 5,323,654 | 6/1994 | Newman ................................... 73/330 |

OTHER PUBLICATIONS

Advertisement from "American Hunter" one page.

*Primary Examiner*—William A. Cuchlinski, Jr.
*Assistant Examiner*—Andrew H. Hirshfeld
*Attorney, Agent, or Firm*—Kurt S. Myers

[57] ABSTRACT

The present invention is directed to an animal feeder sight glass device. The device is a single multi-layered component made of a foam gasket with a central opening which seats on a vessel having an outer wall with an opening in the wall, a transparent lens and an outer lens holder plate also with an opening aligned with the opening in the vessel. The multi-layered component is secured to the vessel with screws which pass through openings in the gasket and outer lens holder plate.

3 Claims, 5 Drawing Sheets

ANIMAL FEEDER SIGHT GLASS DEVICE

FIELD OF THE INVENTION

The present invention is directed to a sight glass device for animal feeders which is easily installed on the many sizes and shapes of vessels used as feeders. More specifically, the present invention is directed to a sight glass device which comprises a foam gasket with an opening which seats around an opening in the metal vessel, a transparent lens, an outside metal plate with an opening and metal screws which align the openings and secure these elements to the metal vessel.

BACKGROUND OF THE INVENTION

Sight glasses on many different vessels are old; however, most require access to the inside of the vessel to either cut an opening with no inside lip to apply the inside plate of an assembly or to secure the nuts used on bolts which secure the sight glass assembly to the vessel or require special structure to secure the sight glass assembly. Other sight glass assemblies require that the vessel have sufficient wall thickness that threads can be cut and tapped to secure the holder element of the assembly to the vessel. Most of the sight glass assemblies require a flat surface on the outside wall of the vessel since there is no structure to secure the sight glass to a curved surface. Illustrations of such sight glass assemblies are found in the following patents:

U.S. Pat. No. 1,039,060 discloses a frame which has upper and lower upper angle iron bars into which a transparent member such as glass is confined.

U.S. Pat. No. 3,407,662 discloses a sight glass requiring that the wall of the vessel be drilled and tapped to receive the bolts which secure the holder of two glass sight glasses.

U.S. Pat. No. 3,438,540 discloses a sight glass that requires bolts which secure a ferrule and lens assembly, including a J-shaped gasket, against the vessel.

U.S. Pat. No. 3,625,390; U.S. Pat. No. 3,942,881; U.S. Pat. No. 3,957,359; and U.S. Pat. No. 4,436,375 each disclose a sight glass assembly comprising a housing having an opening therethrough, a lens mounted in the opening, the opening having an inclined or straight wall, resilient packing interposed between the lens and the inclined or straight wall, a face plate and bolts for securing the face plate to the housing.

U.S. Pat. No. 3,951,301 discloses a sight glass assembly suitable for use with large vessels containing fluids and require bolts which are adapted to register with threaded holes in the wall of the fluid container.

U.S. Pat. No. 3,991,913 discloses a grain viewing and sampling device for a grain bin having an outside door and a top wall sliding gate to permit grain into the container.

U.S. Pat. No. 4,169,309 discloses a method for making a sight glass assembly wherein a temperature differential between the lens and the rigid liner or housing are accomplished by (a) cooling the lens, (b) heating the rigid liner or housing or (c) both cooling the lens and heating the rigid liner or housing.

U.S. Pat. No. 4,182,179 discloses a sight glass assembly having a fluid filled packing member which extends around the periphery of the lens and holds the lens in the housing.

U.S. Pat. No. 4,206,537 discloses a method of making a sight glass assembly using a temperature differential between the lens and the rigid liner or housing.

U.S. Pat. No. 4,809,862 discloses a sight glass assembly using a flange retainer for a fuseview window.

U.S. Pat. No. 4,986,636 discloses a viewing glass having a pane that is arranged directly in the region of the flange and is surrounded by an O-ring for producing a vacuum-tight connection.

U.S. Pat. No. 5,210,658 discloses a sight glass assembly comprising a housing having an opening therethrough, a lens mounted in the opening, the opening having an inclined or straight wall, resilient packing interposed between the lens and the inclined or straight wall, a faceplate and bolts for securing the faceplate to the housing.

An American Hunter sight glass assembly has on the inside of the vessel a flat sheet of clear acrylic plastic and a flat plate and has on the outside a single plate, bolts pass through all members and the wall of the vessel with nuts on the bolts on the inside of the vessel.

In the prior art sight glass assemblies, access to the inside of the vessel or a special structure on the vessel is required for attachment of the sight glass.

The present invention overcomes the cost or problems associated with the requirement of using many special tools or structure to secure a sight glass assembly of the prior art to a vessel. The present invention sight glass device used for animal feeding does not require any access to the inside of the vessel and does not require that the opening in the vessel be cleanly cut. The present invention sight glass device is easily installed working solely on the outside of the vessel to which the device is to be attached.

SUMMARY OF THE INVENTION

The present invention is directed to an animal feeder sight glass device which comprises a foam gasket having a central opening which seats on the metal vessel around an opening in the vessel, a transparent lens, an outside metal lens holder plate with an opening and metal screws which secure these elements and aligning the openings to the outside wall of a metal vessel used to hold animal feed.

DESCRIPTION OF THE PREFERRED EMBODIMENTS

Figure 1:
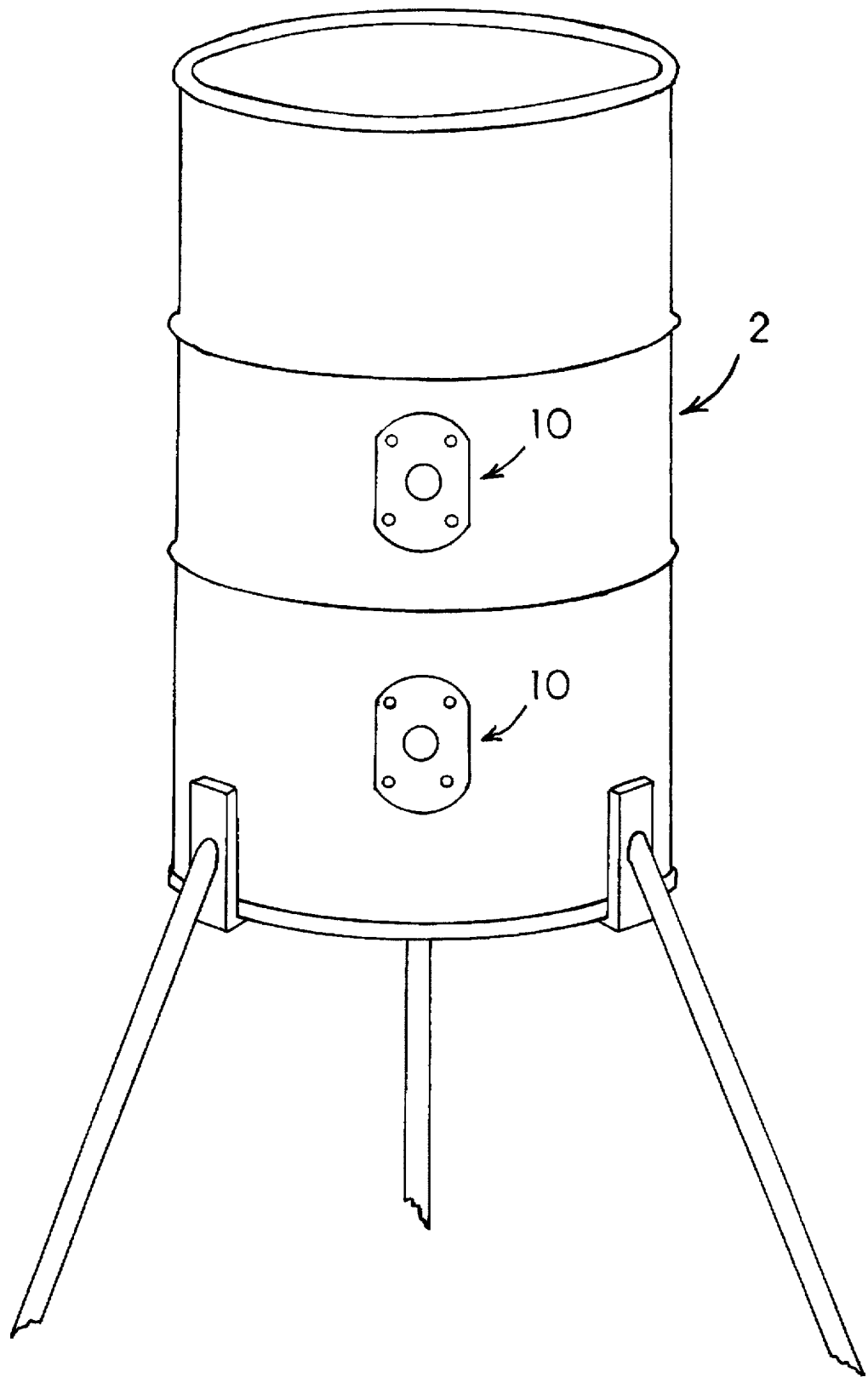
FIG. 1 is an elevational view of an animal feeder with a sight glass device of the present invention.

An animal feeder sight glass device 10 of the present invention is shown on an animal feeder 5 in FIG. 1. As shown, more than one sight glass device 10 may be secured to a single feeder vessel 5.

Animal feeders 5 come in all sizes, shapes and materials of construction. To attach an animal feeder sight glass device 10 of the present invention to an animal feeder vessel 5, at least one opening is made in the outer wall of the vessel 5. For attaching a sight glass device 10 of the present invention, the opening (not shown in FIG. 1) in the wall of vessel 5 needs to be the same size and shape or smaller than the size of the openings in the sight glass device 10. The openings need not be clean cut but may have bent pieces on the inside of the vessel.

Figure 2:
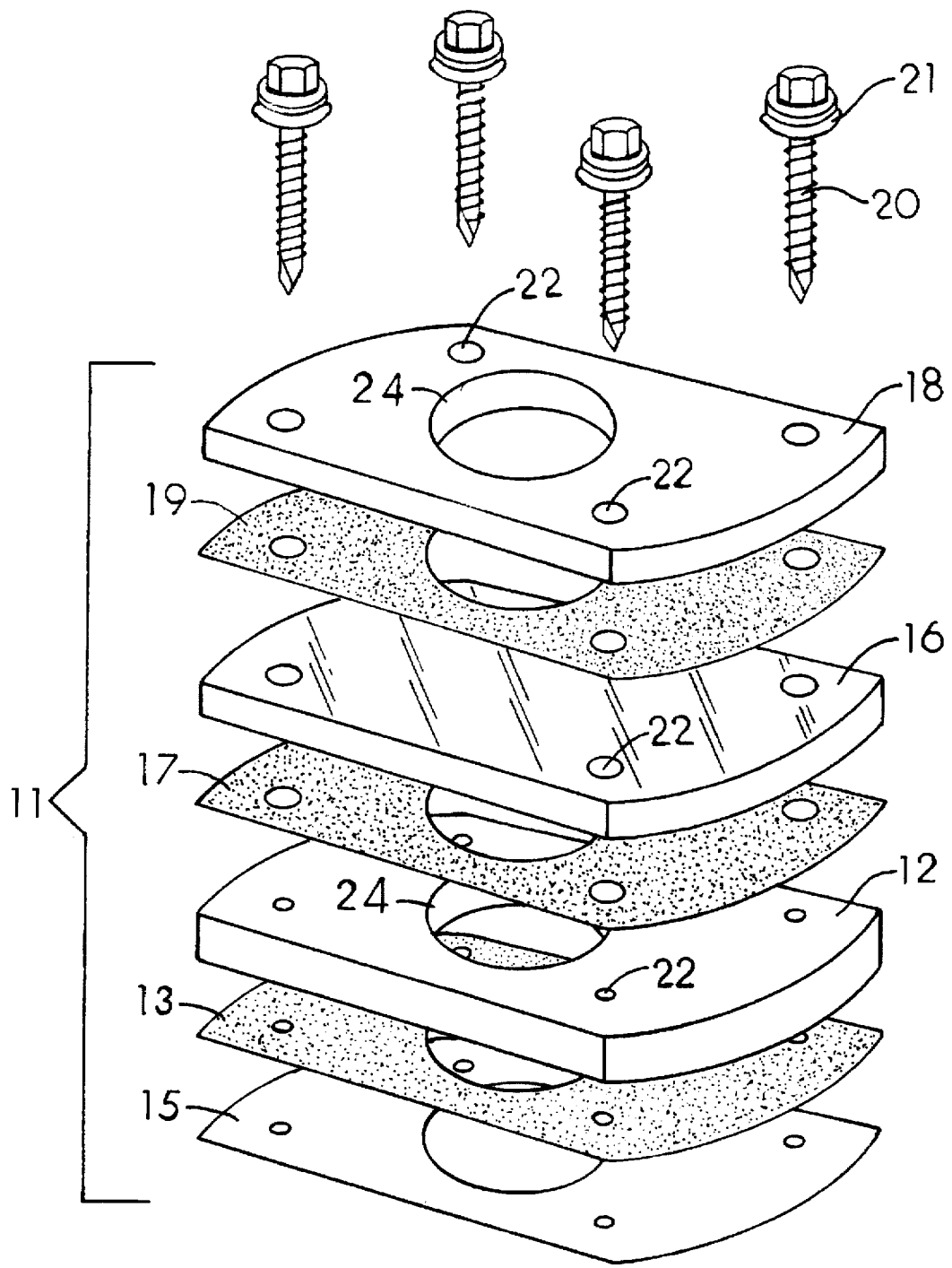
FIG. 2 is an exploded view of a preferred embodiment of an animal feeder sight glass device of the present invention.

Referring now to FIG. 2, which is an exploded view showing all the preferred elements of a sight glass device 10 of the present invention, the preferred embodiment of a sight glass device 10 of the present invention is a single multi-layered component 11 and four metal screws 20. The multi-layered component 11 is made up of a foam gasket 12, a transparent lens 16 and a lens holder face plate 18.

The foam gasket 12 is preferably made of a weather-resistant material such as Armaflex insulation which is a sponge-like closed cell nitrile-rubber material with an adhesive backing, a product of Armstrong World Industries. The Armaflex sheet product is sold with a release paper covering the adhesive for handling. To make a suitable gasket 12, two ⅛" sheets of Armaflex insulation are glued together with a spray adhesive so that the adhesive backing and paper are on the outside of the composite. The composite is cut to form a desired foam gasket 12 and an opening 24 is cut in the center of gasket 12 which when the gasket 12 is applied to the vessel 5, the opening 24 is aligned with the opening (7—see FIG. 3) of the feeder vessel 5. If a foam sheet product used to make the foam gasket 12 does not have a layer of adhesive 13, a spray adhesive is applied to one side of the gasket 12. A piece of release paper 15 is then applied and held by the adhesive 13 until ready to be applied to the vessel 5.

The lens 16 is preferably made from a sheet of acrylic plastic. However, other plastic or transparent material may be used as the lens 16. Glass may be used but is subject to breaking when the vessel 5 is dropped or knocked over.

The lens holder face plate 18 is preferably made of metal. The choice of metal is very broad and may be selected from aluminum or ordinary carbon steels. Metal or a synthetic material such as certain hard plastics like polycarbonates are preferably used as the face plate 18 to prevent animals from chewing the plate 18 away.

The composite 11 is made by using adhesives to affix lens 16 to the foamed gasket 12 and also to the face plate 18. The adhesive layer 17 between lens 16 and the gasket 12 is preferably the adhesive of one sheet of the composite made of the Armaflex insulation product when the paper has been removed. If a single sheet of Armaflex insulation is used, a spray adhesive layer 17 of Duro All-Purpose Spray Adhesive, manufactured by Loctite Corporation, is applied to the exposed side of the Armaflex product. The adhesive layer 19 between lens 16 and the face plate 18 is preferably a two part epoxy, weather grade such as Plastic Welder, manufactured by Devcon Corporation, applied to either the lens 16 or the face plate 18 or both and held together until the epoxy adhesive cures.

In making the multi-layered component 11 of FIG. 2, the gasket 12, the lens 16 and lens holder face plate 18 are cut to the same outside dimensions. It is understood that the geometry need not be as shown, but may be circular, rectangular or any other desired shape. The same template is used to drill the screw openings 22 in the gasket 12, the lens 16 and lens holder face plate 18; however, it is noted that the size of the opening 22 in the lens 16 and face plate 18 are slightly larger than the diameter of the metal screw to be used while the opening in the gasket may be smaller than the diameter of the metal screw to be used. This allows for thermal expansion of the lens 16 and lens holder face plate 18 and reduces the likelihood of these elements causing stress on the screws. The openings 24 in the gasket 12 and lens holder face plate 18 may have a size and shape different than that shown which is about the size of a silver dollar.

Figure 3:
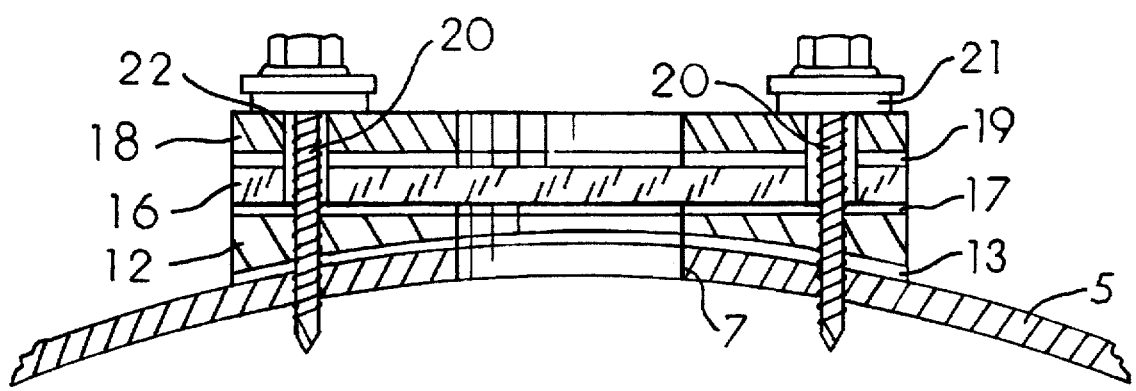
FIG. 3 is a cross-sectional view of an animal feeder sight glass device of the present invention on a cylindrical vessel.

The sight glass device 10 of the present invention is easily attached to a vessel 5. Referring now to FIG. 3, the release paper 15 is removed from the composite 11; the openings 24 of the gasket 12 and the lens holder face plate 18 are aligned with the opening 7 in the vessel; and the composite pressed against the vessel whereby the adhesive layer 13 holds the device 10 to the vessel 5. Each screw 20, with a neoprene washer 21, is inserted in the precut openings 22 and screwed into the wall of the vessel 5. As shown, the compression of the composite 11 will bring the surface of adhesive layer 13 into contact with the wall of the vessel 5 even when the surface of the wall is curved.

Figure 4:
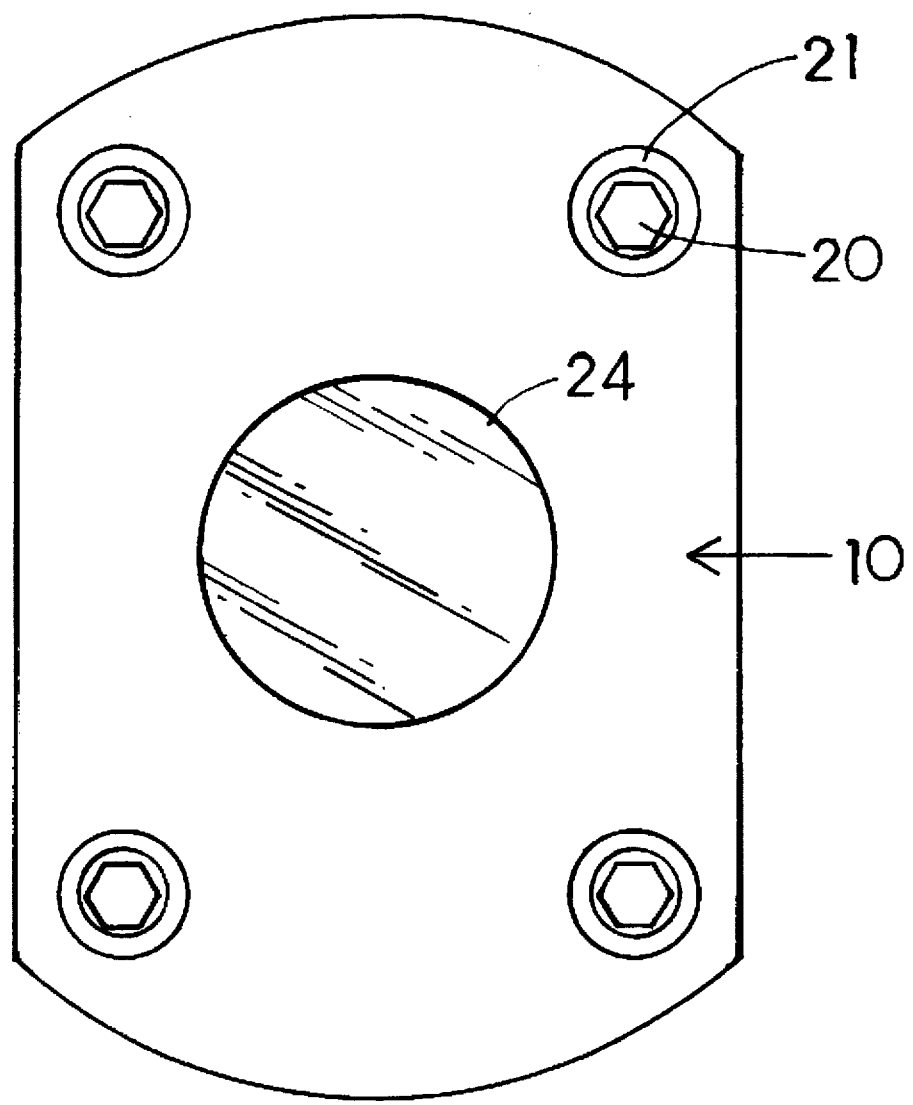
FIG. 4 is a plan view of a preferred embodiment of an animal feeder sight glass device of the present invention.

FIG. 4 shows the preferred sight glass device 10 of the present invention from the outside of the vessel. It is understood that the lens 16 could have a larger dimension than the lens holder face plate 18 or the lens 16 could be held in the inner diameter of the lens holder face plate without departing from the present invention.

Figure 5:
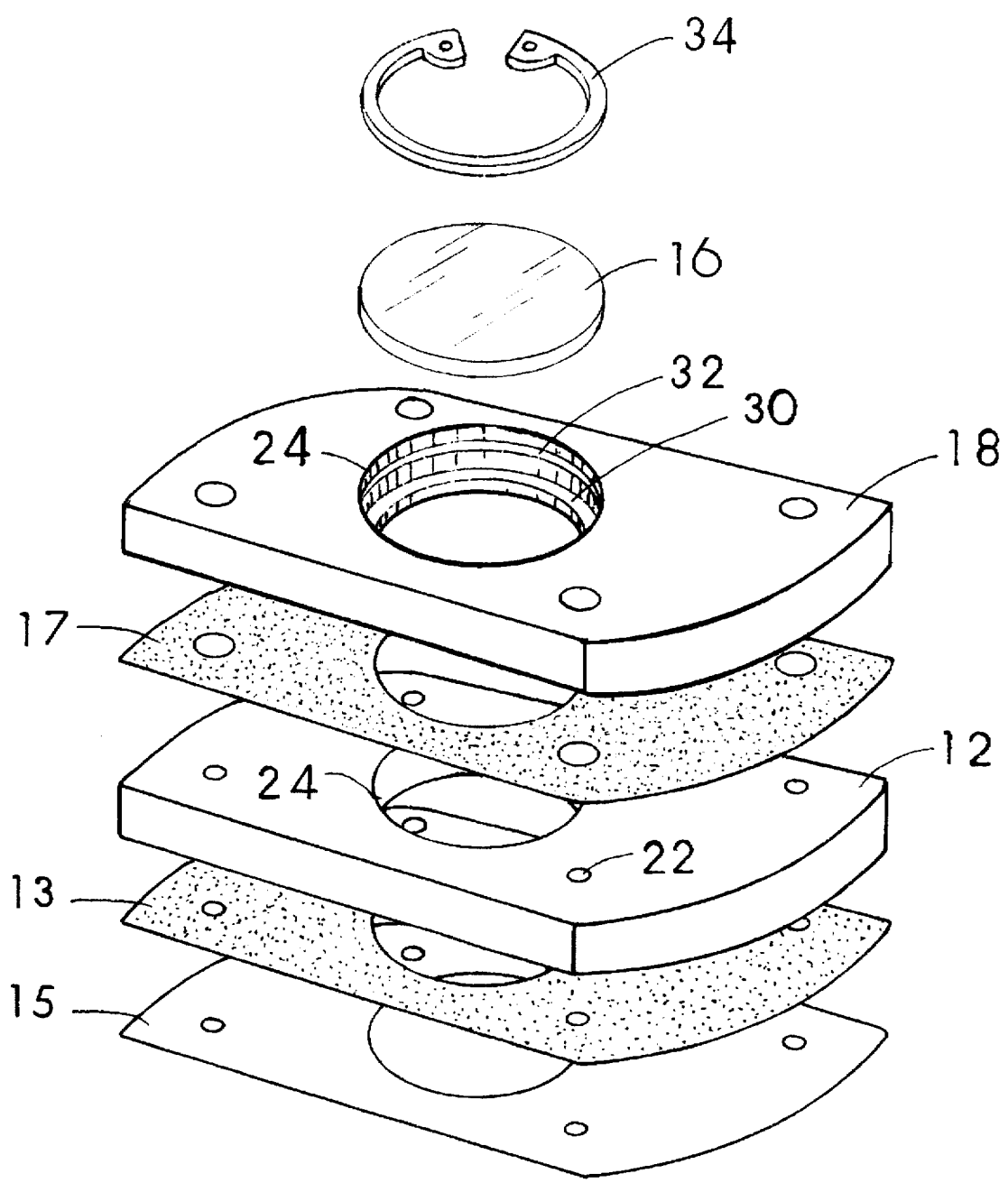
FIG. 5 is an alternative embodiment of the present invention wherein the lens is held inside the opening of a lens holder face plate rather than being compressed by the lens holder face plate.

Referring now to FIG. 5, which is an exploded view showing an alternative embodiment of the multi-layered component 11 of a sight glass device 10 of the present invention, this sight glass device 10 of the present invention is also attached to a vessel 5 with metal screws 20 (not shown in FIG. 5). The multi-layered component 11 is made up of a foam gasket 12, a transparent lens 16 and a lens holder face plate 18. The foam gasket 12 is as described in the preferred embodiment above; however, the gasket will be attached by the adhesive layer 17 directly to the lens holder face plate 18. In this embodiment, the transparent lens 16 has the size and shape of the opening 24 in the lens holder face plate 18. The opening 24 is tapped to a shoulder 30 which acts as a seat for the lens 16. A slot 32 is cut above the shoulder 30 with the bottom of the slot 32 above the shoulder 30 at least the same distance as the thickness of the lens 16. To hold the lens 16 in the opening 24 is a snap ring 34 having a dimension such that enough metal sticks out into the opening 24 to provide a support for the lens 16. Alternatively, the opening may be threaded and a threaded lock ring used to secure the lens in the opening 24.

From the foregoing detailed description, it will be evident that there are a number of changes, adaptations and modifications of the present invention which come within the spirit of the present invention.

I claim:

1. An animal feeder sight glass device for attaching to a vessel which comprises:
   a single multi-layered component adapted to attach to said vessel which consists essentially of:
   (a) a foam gasket with a central opening adapted to seat on said vessel,
   (b) a transparent lens,
   (c) an outside lens holder face plate with an opening, said central opening in said gasket and said opening in said face plate being aligned,
   (d) aligned screw openings in said gasket and face plate, said gasket and face plate having the same outside dimensions,
   (e) an adhesive layer between said foam gasket and said transparent lens, and
   (f) an adhesive layer between said transparent lens and said face plate; and
   metal screws insertable into said outer lens holder face plate of said single component to secure said single component to said vessel.

2. A device according to claim 1 wherein said lens is a sheet of plastic.

3. An animal feeder sight glass device for attaching to a vessel which comprises:

a single multi-layered component adapted to attach to said vessel which consists essentially of:

(a) a foam gasket with a central opening adapted to seat on said vessel, (b) an outside lens holder face plate with an opening having a seat at the bottom, said central opening in said gasket and said opening in said face plate being aligned, (b) a transparent lens sealed at the bottom of said opening in said lens face plate, and means for holding said lens in said opening of said lens holder face plate, (d) aligned screw openings in said gasket and face plate, said gasket and face plate having the same outside dimensions, (e) an adhesive layer between said foam gasket and said said face plate; and metal screws insertable into said outer lens holder face plate of said single component to secure said single component to said vessel.

\* \* \* \* \*